United States Patent
Crayton

[15] 3,658,416
[45] Apr. 25, 1972

[54] MICROFICHE HOLDING DEVICE
[72] Inventor: Bruce E. Crayton, Hamlin, N.Y.
[73] Assignee: Eastman Kodak Company, Rochester, N.Y.
[22] Filed: Feb. 3, 1970
[21] Appl. No.: 8,193

[52] U.S. Cl.................................353/95, 40/158, 353/27, 355/75
[51] Int. Cl......................................G03b 23/08, G03b 1/48
[58] Field of Search.............353/27, 95, 25, 122; 40/63 A, 40/64 A, 158 B; 24/67, 67.3, 243 R, 243 P, 243 GC; 355/75, 76

[56] References Cited

UNITED STATES PATENTS

| | | | |
|---|---|---|---|
| 1,973,827 | 9/1934 | Shwartz | 355/75 |
| 3,533,689 | 10/1970 | Smith et al. | 353/78 |
| 2,562,708 | 7/1951 | Flekel | 355/75 |

Primary Examiner—Leonard Forman
Assistant Examiner—Steven L. Stephan
Attorney—R. W. Hampton and Gary D. Fields

[57] ABSTRACT

A resilient image-bearing medium holding device is disclosed for supporting a resilient image-bearing medium such as a microfiche or aperture card in a projection plane of a microfilm viewing apparatus or reader. The device includes a pair of opposed plates in a fixed relationship to each other and has opposed complementary curved surfaces that flex a resilient image-bearing medium inserted therebetween, thereby lightly holding the resilient image-bearing medium in the inserted position independent of gravitational forces while allowing for relatively easy movement thereof for scanning.

9 Claims, 4 Drawing Figures

BRUCE E. CRAYTON
INVENTOR.

PATENTED APR 25 1972 3,658,416

BRUCE E. CRAYTON
INVENTOR.

BY Gary D. Fields
Robert W. Hampton
ATTORNEYS

MICROFICHE HOLDING DEVICE

CROSS-REFERENCE TO RELATED APPLICATIONS

Reference is made to commonly assigned co-pending U.S. Pat. application Ser. No. 633,570, entitled Assembly For Facilitating Insertion and Selective Positioning of Microfiche in Readers, filed in the name of Homer A. Smith et al., and to commonly assigned co-pending U.S. Pat. application Ser. No. 730,223, entitled Convertible Record Viewer or the like, filed in the name of Elmer O. Wangerin.

BACKGROUND OF THE INVENTION

1. Field of the Invention

This invention relates generally to microfilm viewing apparatus and more particularly to microfilm viewing apparatus including a resilient image-bearing medium holding device having no moving parts and capable of receiving and holding a resilient image-bearing medium when inserted therein.

2. Description of the Prior Art

Microfilm viewing apparatus of the type for projecting images from resilient image-bearing media such as microfiche or aperture cards are generally well known. Moreover, it is well known to provide a holder or other means for supporting microfiche in a suitable plane for projection and a carriage for moving the holder within the projection plane so that images on the microfiche may be selectively aligned with the apparatus projection system to facilitate projection. One such microfiche holder and carriage assembly is disclosed in U.S. Pat. No. 3,352,201 to P. J. Brownscombe. A microfiche is held for projection in the Brownscombe device by a pair of transparent flats. Since the flats are oriented horizontally, the microfiche is held between them by the weight of the upper flat. Similar "sandwich-type" microfiche holders are disclosed in commonly assigned, copending U.S. Pat. application Ser. No. 633,570, entitled Assembly for Facilitating Insertion and Selective Positioning of Microfiche in readers, filed in the names of Homer A. Smith et al., and in commonly assigned, copending U.S. application Ser. No. 730,223, entitled Convertible Record Viewer or the Like, filed in the name of Elmer O. Wangerin. In both the Smith et al. and Wangerin devices, a microfiche is held between transparent flats as a result of the flats being biased toward each other, which bias must be removed before the microfiche may be inserted or removed from between the flats. If the flats were not biased, it is readily apparent that, when oriented in a near-vertical position, they would be incapable of holding a microfiche inserted therebetween when the flats were separated even a very small distance greater than the thickness of the microfiche itself. Even with the aid of compliant material on the opposed surfaces of the flats, the additional distance which the flats may be separated without completely releasing the microfiche is not significant.

Relatively complex carriage devices are disclosed in Brownscombe and Smith et al. for providing movement of the holder-encased microfiche within the projection plane, while in Wangerin the holder-encased microfiche is manipulated manually within the projection plane, being held between a pair of fabric-pile-covered plates biased toward each other. With the ever increasing use of microfiche in business and industry, there is a need for a personal microfiche reader. Such a reader should be economical, compact, and lightweight as well as reliable, thereby necessitating simplicity in design. Elaborate and complex holder and carriage assemblies as described above do not lend themselves readily to such a personal reader. It is therefore desirable to provide a small and relatively simple microfiche holder, suitable for use in a personal microfiche reader.

SUMMARY OF THE INVENTION

Accordingly, it is a principal object of the present invention to provide a small, compact, and lightweight microfilm reader having improved means for facilitating the insertion and manipulation of resilient image-bearing medium therein.

It is a further object of this invention to provide an apparatus for holding a resilient image-bearing medium within the projection plane of a microfiche reader by flexing the image-bearing medium inserted therein, thereby producing forces for holding the image-bearing medium independent of gravitational forces while permitting relatively free movement thereof for image selection.

In accordance with this invention a projection apparatus or reader having a projection plane is provided for projecting images from resilient image-bearing media inserted into the projection plane. A pair of members are fixedly supported in opposed relation on opposite sides of the projection plane with means located on the opposing surfaces or faces of the two members for producing flexing of an image-bearing medium inserted therebetween. In the embodiment of the invention disclosed below, such flexing means take the form of complementary, curved, opposing surfaces which define a serpentine-like curved path between the members. When a resilient image-bearing medium such as a microfiche or aperture card is inserted into the curved path, it is flexed, thereby exerting restoring forces, which forces lightly hold the image-bearing medium between the members with minimum contact between the curved surfaces and the medium. While the members are spaced close enough together to flex an image-bearing medium when inserted therebetween they are spaced far enough apart to permit relatively easy manipulation of the medium for image selection.

The invention, and its objects and advantages, will become more apparent in the detailed description of the preferred embodiments presented below in conjunction with the accompanying drawings.

DESCRIPTION OF THE PREFERRED EMBODIMENT

Figure 1:
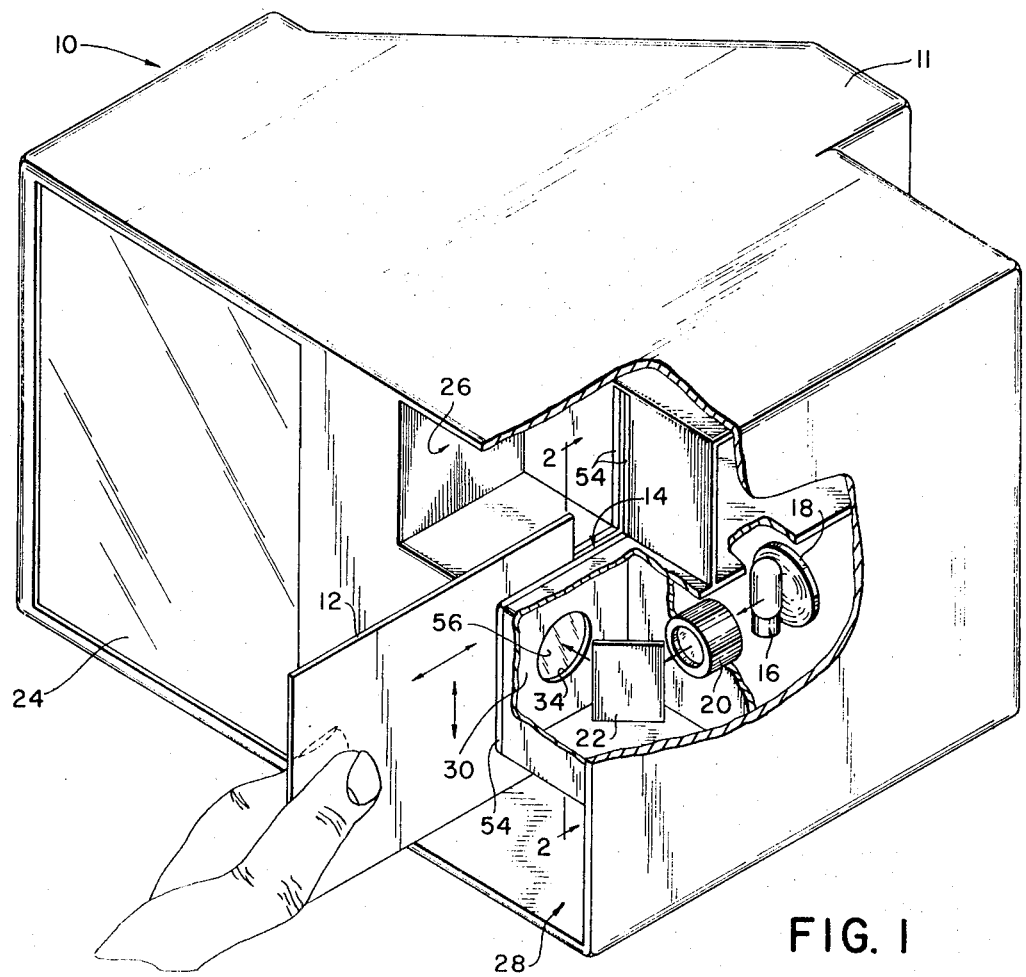
FIG. 1 is a perspective view of a small microfilm projection apparatus or reader with parts broken away to show details of the projection system and location of the image-bearing medium holding device.

Referring now to the drawings and in particular to FIG. 1 there is shown a small projection apparatus or personal microfiche reader 10, having a housing 11, which is compact and lightweight. Reader 10 is adapted to receive microfilm cards or microfiche 12, shown partially inserted into a projection plane defined by microfiche holding device or film gate 14, in a manner to be described in detail. The projection system of reader 10 includes an illumination source or lamp 16, a reflector 18, a condenser lens 20, and a mirror 22 which, in operation, directs light from condenser 20 to film gate 14. After passing through film gate 14 and microfiche 12, the light passes through a projection lens (not shown) and is directed to display surface or opaque viewing screen 24, mounted in housing 11, by the way of a folded light path and mirrors (also not shown) in a manner readily apparent to one skilled in the art.

So that microfiche 12 may be manually manipulated for movement in any direction within the projection plane, there are a pair of recesses or cavities 26 and 28 in housing 11 of reader 10, disposed above and blow film gate or holder 14 respectively. With cavities 26 and 28 so located, the operator may insert his fingers either above or below holder 14 to grasp microfiche 12 when inserted in holder 14, thereby enabling him to manipulate the microfiche for image selection.

Figure 2:
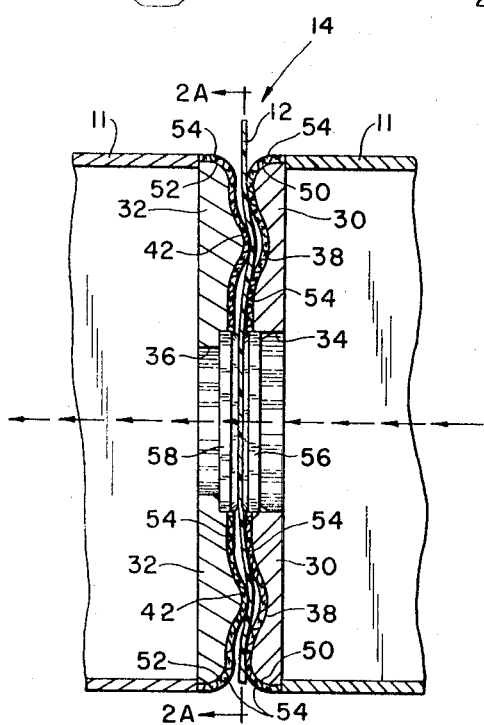
FIG. 2 is a vertical section of the holding device taken along lines 2—2 of FIG. 1.

The means for holding a flexible image-bearing medium or microfiche 12 within the projection plane will now be described. As shown in FIG. 2, holder 14 includes a pair of opposed members 30 and 32 positioned substantially on either side of the projection plane of reader 10. Members 30 and 32 include a pair of aligned projection apertures 34 and 36, respectively, through which light from the projection system passes during projection of images contained on microfiche 12, as illustrated by the arrows in FIGS. 1 and 2. Members 30 and 32 are also provided with means for flexing microfiche 12 when inserted therebetween. Such means can take the form of, but are not limited to, curved surfaces in complementary relationship defining a serpentine-like path into which microfiche 12 may be inserted by the operator. When inserted therein, microfiche 12 is flexed sufficiently to develop restoring forces within microfiche 12 itself, thereby preventing the microfiche from moving when released from the operator's hand.

Figure 2A:
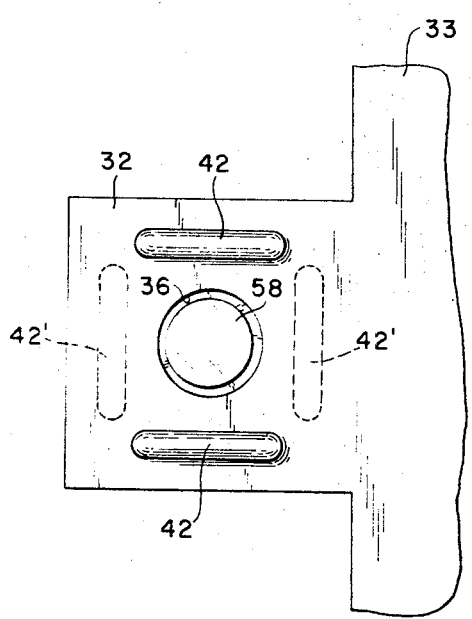
FIG. 2A is a front elevation of one member of the holding device showing an alternative arrangement in phantom.

In the disclosed embodiment, the curved complementary surfaces are indicated as depressions 38 in the face of member 30 and raised portions 42 in the face of member 32. The raised portions 42 are positioned so as to be in complementary relation with depressions 38. As can best be seen in FIG. 2, microfiche 12, when inserted between members 30 and 32, is flexed slightly due to the curved path it must follow. Although depressions 38 and raised portions 42 can take any one of a number of shapes, in this embodiment depressions 38 are depicted as a pair of horizontal elongate depressions disposed in the face of member 30 on either side of aperture 34, and raised portions 42 are illustrated as a pair of horizontal elongate protuberances complementary in both shape and position to depressions 38 and disposed on the face of member 32 on either side of aperture 36, as shown in the front view of member 32 in FIG. 2A. Although the depressions 38 and raised portions 42 are shown in FIGS. 2 and 2A as being oriented horizontally, it will be understood that, alternatively, they may also be oriented vertically as shown by raised portions 42' in phantom in FIG. 2A, or at any other suitable position between horizontal and vertical. Also, both horizontal and vertical sets of depressions and complementary raised portions, as illustrated in FIG. 3, may be utilized without departing from the scope of this invention.

Figure 3:
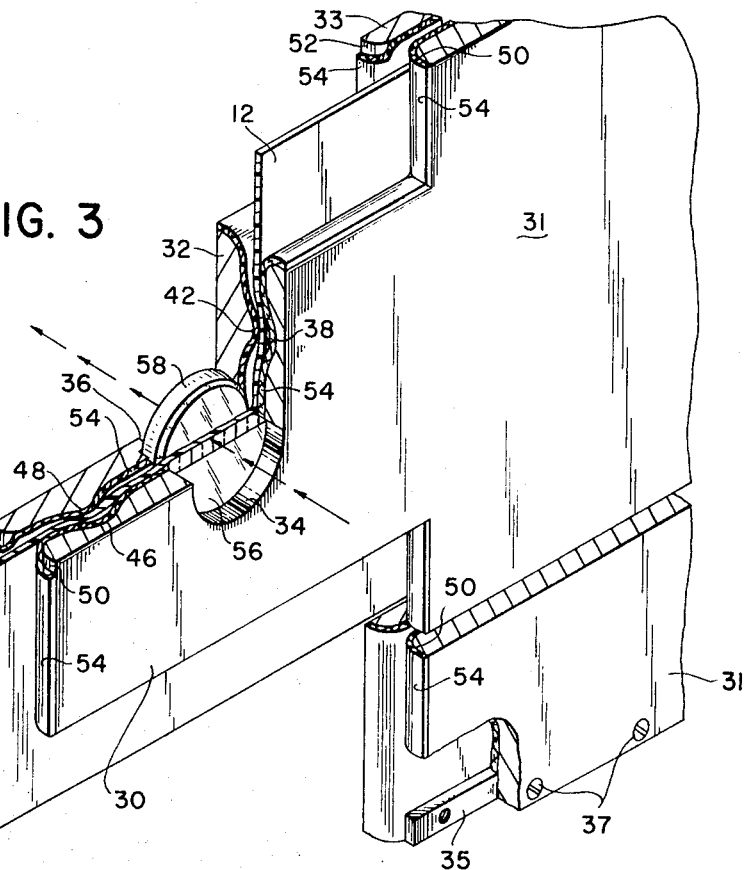
FIG. 3 is a perspective view, partly in section, of the holding device showing further structural details.

Referring now to FIG. 3, further structural details of holding device 14 are shown. Although holder 14 is here illustrated as having a set of vertical depressions 46 and raised portions 48, as well as the horizontal set of depressions 38 and raised portions 42 previously described, it is understood that the same structural details apply to alternate embodiments of the device utilizing only one set of depressions and raised portions in any orientation. As can be seen in FIG. 3, members 30 and 32 are merely extensions of plates 31 and 33, respectively, which plates are fixedly mounted in housing 11 and are fixedly spaced apart at both the top (not shown) and bottom by a spacer bar 35 and secured by screws 37. Plates 31 and 33 are wide enough and extend far enough into reader 10 so as to be able to accommodate a microfiche when fully inserted into the device, i.e., when the column of images farthest from the edge of the microfiche first inserted is aligned with apertures 34 and 36. Members 30 and 32, as well as plates 31 and 33, may have beveled or rounded edges 50 and 52, respectively, so as to facilitate insertion of a microfiche therebetween. Further, if desired, the mating surfaces of members 30 and 32 and plates 31 and 33 can be covered with a soft compliant material 54 such as plush or felt, as shown in FIGS. 2 and 3, so as to protect the microfiche from being scratched or damaged when inserted between the plates.

In FIG. 2, there is also shown means for substantially maintaining within the projection plane that part of an image-bearing medium, in this case microfiche 12, which is aligned with apertures 34 and 36. In the preferred embodiment, that means is illustrated as a pair of transparent flats 56 and 58 which are shown mounted in apertures 34 and 36, respectively. Transparent flats 56 and 58 may be made of any suitable transparent material such as glass or plastic and are spaced apart a distance slightly greater than the thickness of standard microfiche material. Microfiche positioned between flats 56 and 58 will be prevented from buckling during projection due to heat of the projection system. If the light level of the projection system is so low that a buckling problem is not presented, transparent flats 56 and 58 can be eliminated.

Since members 30 and 32 are stationary, the spacing between them is critical to the invention, and is dictated by the following factors. First, members 30 and 32 are close enough together to provide sufficient contact with the microfiche inserted therebetween so as to slightly flex the microfiche, thereby preventing it from falling out of holder 14 when released by the operator. Second, the members are spaced far enough apart so that the contact with the microfiche is minimal, thereby allowing for relatively free movement of the microfiche for image selection while inserted between the members. With these two criteria having been met, an operator is able to insert a microfiche into holder 14 and move it around, cursorily examining the images until he finds the image which he desires to inspect further, at which time he may release the microfiche and it will remain at that position without further movement.

As is apparent from the foregoing description, the microfiche holding device or film gate 14 is a relatively simple device with no moving parts, thereby contributing to a long product life that is relatively service free. Although its simple design lends it readily to incorporation into readers of the small and compact variety, nonetheless it may be incorporated into larger readers where there is the desire and/or necessity for a simple and reliable microfiche holder.

The invention has been described in detail with particular reference to preferred embodiments thereof, but it will be understood that variations and modifications can be effected within the spirit and scope of the invention.

I claim:

1. In projection apparatus having a projection plane, means for projecting an image from a resilient image-bearing medium located in and movable in said projection plane, and means for holding a resilient image-bearing medium substantially in said projection plane, the improvement wherein said holding means comprises:

first and second members supported by said apparatus in opposed relation on opposite sides of said projection plane and having opposing surfaces, said first and second members each having an aperture optically aligned with said projecting means through which apertures light can be projected; and first and second means respectively on said opposing surfaces of said first and second members for cooperatively flexing a resilient image-bearing medium inserted between said opposing surfaces to create restoring forces within the inserted medium, which forces substantially hold the medium, independent of gravity, in an inserted position between said first and second members, said first and second flexing means being spaced sufficiently close enough together to flex an image bearing medium inserted therebetween to create said restoring forces in said medium but sufficiently far enough apart to permit relatively free movement of said medium between said first and second members.

2. The invention defined in claim 1 wherein said holding means further comprises:

means for maintaining substantially in said projection plane that portion of an inserted image-bearing medium which is between said apertures.

3. In projection apparatus having a projection plane, means for projecting an image from a resilient image-bearing medium located in and movable in said projection plane, and a film gate for holding a resilient image-bearing medium substantially in said projection plane, the improvement wherein said film gate comprises:

a first member supported on one side of said projection plane; and a second member supported in closely spaced, opposed relation to said first member on the opposite side of said projection plane, said first and second members each having a curved surface, said curved surfaces being complementary and opposed so that a resilient image-bearing medium inserted between said first and second members is flexed to create forces in the inserted medium, which forces maintain the position of the medium between said first and second members, said curved surfaces respectively of said first and second members being spaced sufficiently close enough together such that an inserted image-bearing medium is flexed but sufficiently far enough apart to permit relatively free movement of said medium between said first and second members.

4. The invention defined in claim 3 wherein said first and second members each further include:

means defining an aperture through which light can be projected, each member being supported at a location so that said aperture is in optical alignment with said projecting means.

5. The invention defined in claim 4, said first and second members each further comprising:

a transparent plate mounted within said aperture defining means of each of said members, said plates being spaced from each other a distance such that the portion of the inserted image-bearing medium which is between said transparent plates is maintained substantially in said projection plane.

6. The invention defined in claim 4, said first and second members each further comprising:

compliant material at least partially covering said curved surface for minimizing damage to the image-bearing medium.

7. Apparatus for holding a resilient image-bearing medium in the projection plane of a projector, said apparatus comprising:

a first holding member having a first curved surface and a first aperture through which light can be projected, said first member being supported on one side of the projection plane with said first curved surface facing the projection plane;

a second holding member having a second curved surface and a second aperture through which light can be projected, said second member being supported on a side of the projection plane opposite said first member with said second curved surface facing the projection plane and with said second aperture aligned with said first aperture of said first member, said first and second holding members being spaced sufficiently close enough together so that a resilient image-bearing medium inserted therebetween is sufficiently flexed by said members to hold said medium in a fixed position but sufficiently far enough apart to permit relatively free movement of said medium between said first and second members.

8. The apparatus defined in claim 7 further comprising:

a first transparent plate mounted within said first aperture of said first holding member; and a second transparent plate mounted in said second aperture of said second holding member, said first and second transparent plates being spaced from each other so that a portion of the inserted image-bearing medium which is between said transparent plates is maintained substantially in the projection plane.

9. The apparatus defined in claim 7 further comprising:

compliant material at least partially covering said first and second curved surfaces of said first and second holding members for minimizing damage to the image-bearing medium inserted between said members.

* * * * *